Nov. 30, 1926.
W. M. DWYER
1,609,069
HAND BRAKE FOR RAILWAY CARS
Filed Jan. 30, 1922
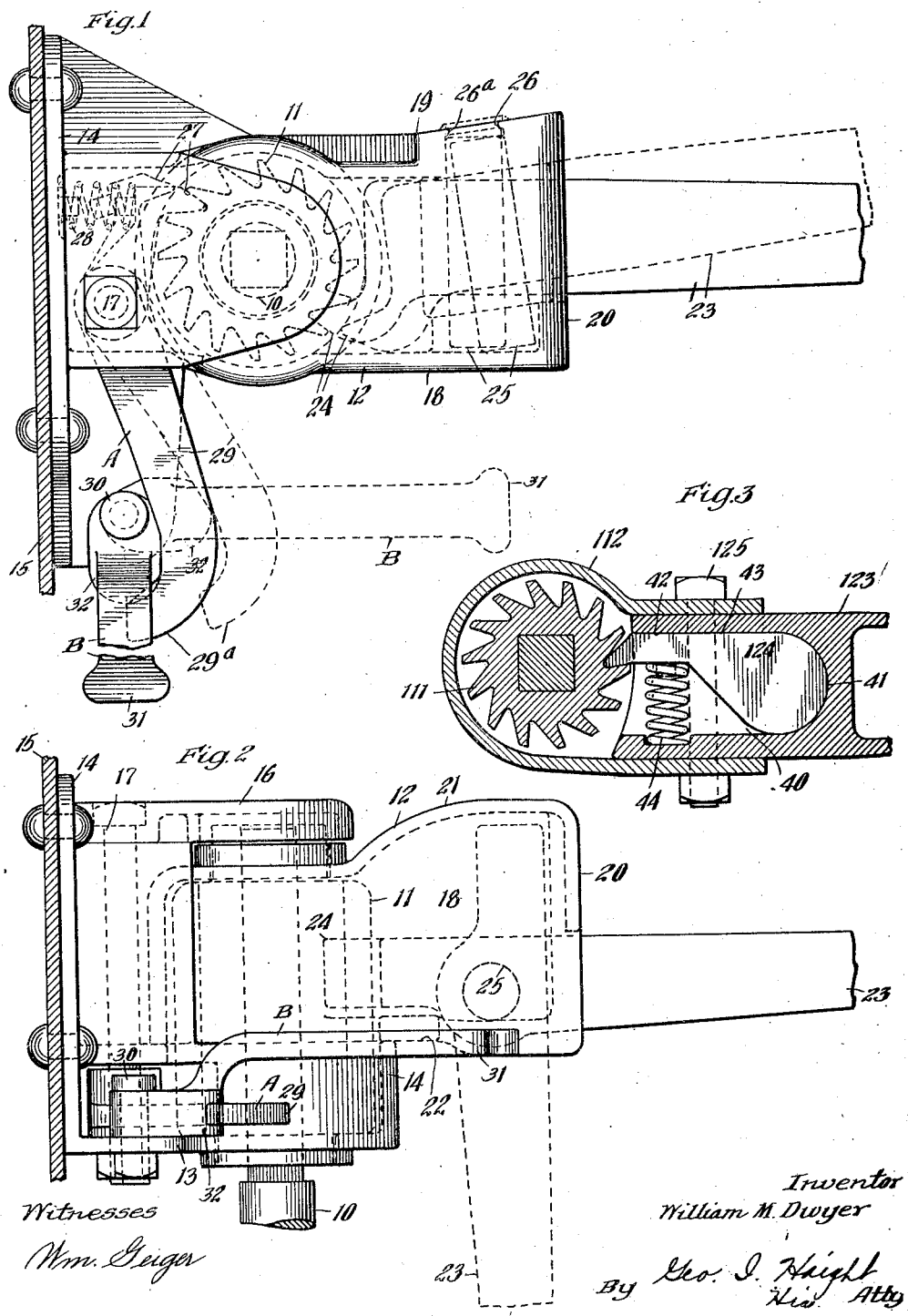
Inventor
William M. Dwyer
By Geo. I. Haight
His Atty
Witnesses
Wm. Geiger Patented Nov. 30, 1926.

1,609,069

UNITED STATES PATENT OFFICE.

WILLIAM M. DWYER, OF CHICAGO, ILLINOIS, ASSIGNOR, BY MESNE ASSIGNMENTS, TO W. H. MINER, INC., A CORPORATION OF DELAWARE.

HAND BRAKE FOR RAILWAY CARS.

Application filed January 30, 1922. Serial No. 532,653.

This invention relates to improvements in hand brakes for railway cars.

It is well known to those skilled in the art, that hand brakes on railway cars do not always move to fully released position when the brakes are released in the ordinary manner, this being due, sometimes, to bending of the brake staff or bulging of the car ends which imposes friction sufficient to prevent the brake shoes fully releasing from the wheels. Obviously, where the brake shoes are not fully disengaged from the wheels, the car offers greater resistance to movement consequently imposing additional burden upon the locomotive and in addition causing faster wearing of the wheels and brake shoes.

One object of my invention is to provide a hand brake arrangement for freight cars such that, when the brake is released, the brake staff or other chain-tightening member will be left entirely free to gradually allow the brake shoes to fully clear themselves from the wheels even though the staff may bind at the time the brake is released by the brakeman.

Other objects of the invention are to provide a novel type of gravity pawl operating handle and mounting therefor and to generally improve the efficiency of a ratchet type of hand brake for vertical brake staffs.

In the drawing forming a part of this specification, Figure 1 is a top plan view of a hand brake showing my improvements in connection therewith. The brake shown in this figure is of the vertical staff type. The full and dotted line positions of the operating handle are shown to illustrate the manner of oscillating the handle to effect the winding or tightening of the chain. The locking dog and release lever associated therewith are shown in full and dotted positions. Figure 2 is a side elevation of the structure illustrated in Figure 1, the release lever however being shown in the position assumed when the locking dog is held out of engagement with the ratchet wheel. Figure 3 is a horizontal sectional view showing a somewhat different embodiment of the invention.

In said drawing, 10 indicates the upper portion of a vertical brake staff, the extreme upper end of which is made of non-circular cross section, preferably square and has secured thereto a ratchet wheel 11. Above and below the ratchet wheel, the square section of the staff has suitable bushings applied thereto which provide bearings for an oscillating housing or carrier 12. As will be evident the carrier is adapted to oscillate in a plane perpendicular to the staff as now well known in this art. The lower end of the carrier 12 is rotatable in a suitable bearing provided in the lower flange 13 of a supporting bracket 14 which is riveted to the car wall 15. Said bracket 14 is extended outwardly so as to partially enclose the carrier 12 and with the latter provide a housing for the ratchet wheel and parts associated therewith. A top or cap plate 16 is applied to the top of the bracket and held in position by a through bolt 17.

The housing 12 is laterally extended, the lateral extension being defined by side walls 18 and 19, outer wall 20, upwardly curved top wall 21 and bottom wall 22. Pivotally mounted within the laterally extended portion of the housing is the operating handle or lever 23 which has preferably a pawl or tooth 24 integrally formed therewith, the latter being adapted to engage successively with the teeth of the ratchet wheel 11. The operating handle 23 swings in a vertical plane from a vertical inoperative position to a horizontal operative position, as shown in Figure 2. When in the horizontal position, the pawl or tooth 24 is adapted to engage with the ratchet teeth by swinging the lever 23 or oscillating it in a horizontal plane as indicated in Figure 1. The combined movements of the lever 23 are made possible by a pivot pin 25 which is entered through an opening 26 in the wall 19 and driven with a tight fit through a corresponding opening of the lever 23. The metal around the edge of the opening 26 may be hammered over as indicated at 26ᵃ so as to prevent the pin 25 from coming out accidentally. The interior of the lateral extension of the carrier is so formed as to permit the pin 25 to oscillate in a horizontal plane on the bottom wall 22 and also to allow the handle to turn on said pivot pin when moving in a vertical plane. As will be understood by those skilled in the art, the end wall 20 and bottom wall 22 will be suitably cut away to allow for the necessary movements of the lever 23.

To hold the staff against rotation in an unwinding direction and to maintain the brake chain taut, I employ a locking dog designated generally by the reference A. Said locking dog is in the form of a lever pivoted on the bolt 17 near the bottom of the bracket 14, said dog A having a single tooth 27 engageable with the teeth of the ratchet wheel 11. Said toothed end of the dog is normally influenced to operative position by means of a relatively heavy spring 28 which is interposed between the back side of the tooth and a portion of the bracket 14.

On the opposite side of the pivot, the dog A has a handle 29, the outer end of which is curved backwardly toward the wall of the car as indicated at 29ᵃ.

Cooperable with the dog A is a release lever B. The latter is pivoted to a laterally extended flange portion on the bottom of the bracket 14 as by the bolt 30. Said release lever B has a relatively elongated handle proper 31 which, in release position, extends preferably parallel to the car wall and, in operative position, extends outwardly approximately perpendicular to the car wall. Near its point of pivotal support, the release lever B is provided with a cam shaped enlargement 32 which moves in the plane of the handle of the dog A and is adapted to engage the latter to release the dog tooth 27 when the release lever B is swung to the dotted line position shown in Figure 1.

The cam section 32 of the release lever B and the cooperating bearing portions of the dog A are so related that, not only will the dog be disengaged from the ratchet wheel but will be held so disengaged or locked when the release lever B is left in the dotted line position shown in Figure 1. With this arrangement, when the brake is released in the ordinary manner, the staff is left free and should there be any binding of the parts, leaving the brake shoes in contact with the wheels, nevertheless the staff or other parts which are frictionally bound are free to jar themselves completely loose as soon as the car starts moving. Hence, I am enable to eliminate all drag of the brake shoes on the wheels. It will also be observed that the release lever B enables me to apply much greater pressure than customary in effecting the disengagement of the locking dog and this in turn allows me to employ a much heavier spring 28 to insure the dog remaining in operative engagement with the ratchet wheel during the tightening of the brake chain.

Referring to Figure 2, it will be noted that the handle of the release lever B is upwardly offset so as to lie in the path of movement of the carrier 12 when it is oscillated toward the release lever. This is done so that, as the brakeman starts to tighten up the chain, when the release lever B has been left in its dotted line position shown in Figure 1, he will necessarily push the release lever B so as to allow the dog A to cooperate with the ratchet wheel and thus eliminate useless work on the part of the brakeman which might otherwise occur if he did not happen to pay attention to the condition of the locking dog and release lever prior to starting the application of the brakes.

Referring to the construction shown in Figure 3, the arrangement of carrier, staff and ratchet wheel is the same as shown in the other two figures of the drawing. In the construction of Figure 3 the hand lever 123 is pivotally attached to the carrier 112 by a bolt 125, adapting the hand lever to swing vertically. The upper or inner end of the lever 123 is provided with a longitudinally extending socket 40 which is open at its end facing the ratchet wheel. The inner end of the socket is rounded as indicated at 41 to provide a pivotal bearing for a pawl 124 which is adapted to cooperate with the ratchet wheel 111. The pawl 124 is formed with a flat face 42 which is adapted to bear against a corresponding flat face 43 of the handle when the pawl is engaged with the ratchet wheel. With this construction, it is impossible for the tooth of the pawl to slip out from between the teeth of the ratchet wheel regardless of the pressure which may be applied to the tooth and which is a difficulty sometimes encountered in other types of ratchet hand brakes when the tension on the chain becomes very great. The pawl 124 is adapted to oscillate sufficiently to slip over the ratchet teeth against the action of a compression spring 44 which is interposed between said pawl and the opposite wall of the handle.

I claim:—

1. In a hand brake, the combination with a vertical staff having a ratchet wheel rotatable in unison therewith; of a carrier oscillatably mounted on said staff, said carrier having a gravity drop handle supported therefrom, said handle being provided with a pawl cooperable with said ratchet wheel; of a spring-influenced pivotally mounted locking dog cooperable with said ratchet wheel; and a release lever cooperable with said dog to move the dog to inoperative position and retain the latter in such position, said release lever having a portion thereof disposed in the path of movement of said carrier whereby oscillation of the latter will cause it to actuate the release lever and restore the locking dog to operative condition.

2. In a hand brake, the combination with a vertical staff having a ratchet wheel rotatable therewith; of a carrier oscillatably mounted on said staff in the plane of the ratchet wheel; a gravity drop handle pivotally mounted on said carrier and provided with a pawl rigid therewith cooperable with said ratchet wheel, said handle being pivotally connected to said carrier by a pivot pin rigid with the handle, said handle and pivot pin being also oscillatable on the carrier in a plane perpendicular to the staff; and means for locking said staff against accidental rotation in an unwinding direction.

3. In a hand brake, the combination with a vertical brake staff having a ratchet wheel rotatable therewith; of means for preventing rotation of said staff in an unwinding direction; a carrier oscillatably mounted on said staff in the plane of the ratchet wheel, said carrier having a laterally extended hollow housing; an operating handle having an integral pawl tooth; and a pivot pin extending through said handle and disposed within said laterally extended hollow housing of the carrier, said pivot pin being oscillatable with respect to the carrier in a plane perpendicular to the staff and also rotatable about an axis in said plane to allow the handle to fall under the influence of gravity to an inoperative position.

4. In a hand brake, the combination with a member adapted to be rotated to effect tightening of a brake chain; of a ratchet wheel rotatable with said member; a pivoted locking dog co-operable with said ratchet wheel, said dog being normally urged to operable position and having an extension thereon; and means in the form of a lever movable in the same direction as said extension, and provided with means for moving the same to, and locking the same in released position.

5. In a hand brake, the combination with the wall of a car; of a member adapted to effect tightening of a brake chain; of a ratchet wheel rotatable with said member; a pivoted locking dog co-operable with said ratchet wheel, said dog being normally urged to operative position and having a handle disposed adjacent said wall and movable away from the same to disconnect said dog; and a lever pivotally mounted between said wall and said handle and provided with cam means adapted upon movement of said lever away from said wall to co-act with said handle to release said dog and maintain the same in locked position.

6. In a hand brake, the combination with a member adapted to be rotated to effect tightening of a brake chain; of a ratchet wheel rotatable with said member; a pivoted locking dog co-operable with said ratchet wheel, said dog being normally urged to operative position and provided with an extension; and a pivoted lever provided with cam means adapted to engage said extension to retract the same, said cam means being arranged between the end portion of said lever and said pivotal connection.

7. In a hand brake, the combination with a member adapted to be rotated to effect tightening of a brake chain; of a ratchet wheel rotatable with said member; a pivoted locking dog co-operable with said ratchet wheel, said dog being normally urged to operative position and provided with a handle; and a lever for operating said dog to retract the same, said lever being provided with cam means arranged in the plane of said handle, said lever being offset to clear said handle.

8. In a hand brake mechanism, the combination with a member adapted to be rotated to effect tightening of a brake chain; of a ratchet wheel rotatable with said member; a pivoted locking dog co-operating with said ratchet wheel, said dog being normally urged to operative position and having a handle movable in one direction to release said dog; and means including a lever pivotally mounted at the side of the lever opposite to its direction of movement, and including means for moving said handle to retracted position upon operation of said lever, said lever when in inoperative position permitting operation of said dog by said handle.

9. In a hand brake, the combination with a vertical staff having a ratchet wheel rotatable therewith; of a carrier oscillatably mounted on said staff in the plane of the ratchet wheel; a gravity drop handle pivotally mounted on said carrier and provided with a pawl co-operable with said ratchet wheel; a pivoted locking dog co-operable with said ratchet wheel, said dog having a handle; and a manually operable release lever, said release lever being movable in the same direction as said handle and including cam means adapted to be interposed between said release lever and the handle of said locking dog.

In witness that I claim the foregoing I have hereunto subscribed my name this 17th day of January, 1922.

WILLIAM M. DWYER.